CARTON HAVING HINGED COVER

Original Filed April 28, 1961 4 Sheets-Sheet 1

INVENTOR.
JAMES W. HENRY
BY
his ATTORNEYS.

CARTON HAVING HINGED COVER

Original Filed April 28, 1961 4 Sheets-Sheet 2

INVENTOR.
JAMES W. HENRY
BY
Brumbaugh, Free, Graves & Donohue
his ATTORNEYS.

CARTON HAVING HINGED COVER

Original Filed April 28, 1961 4 Sheets-Sheet 3

INVENTOR.
JAMES W. HENRY
BY
Brumbaugh, Free, Graves & Donohue
his ATTORNEYS.

CARTON HAVING HINGED COVER

Original Filed April 28, 1961 4 Sheets-Sheet 4

INVENTOR.
JAMES W. HENRY

BY
Brumbaugh, Free, Graves & Donohue
his ATTORNEYS.

United States Patent Office

Re. 26,185
Reissued Apr. 4, 1967

26,185
CARTON HAVING HINGED COVER

James W. Henry, Clarksville, Ind., assignor, by mesne assignments, to American Can Company, New York, N.Y., a corporation of New Jersey Original No. 3,125,280, dated Mar. 17, 1964, Ser. No. 106,298, Apr. 28, 1961. Application for reissue Mar. 15, 1966, Ser. No. 539,246
6 Claims. (Cl. 229—51)

Matter enclosed in heavy brackets [ ] appears in the original patent but forms no part of this reissue specification; matter printed in italics indicates the additions made by reissue.

This invention relates to improvements in cartons and particularly to a novel carton and to a cut and scored blank from which the carton is made.

The novel carton of the present invention includes a lower receptacle composed of a bottom and a plurality of upstanding walls and a cover hinged to one of the upstanding walls of the lower receptacle and having a plurality of downwardly depending walls which fit in telescoping relationship with the corresponding upstanding walls of the lower receptacle. The carton is made from a blank which is cut and scored to define a plurality of panels connected by scored lines and, in particular, a supplemental panel having a weakened line therein which divides the supplemental panel into two parts. In use, the carton is set up for either end filling or top filling before the final closure of the carton. However, irrespective of whether cartons are end filled or top filled, they will have the same style, appearance and structure after final closure.

After final closure of the carton and before it is opened, the hinged cover of the carton is maintained in closed position by the supplemental panel, part of which on one side of the weakened line is affixed to the cover and the other part on the opposite side of the weakened line is affixed to one of the upstanding walls of the lower receptacle. The carton is opened simply by separating the panel along the weakened line and lifting the hinged cover.

The carton has a long life even after the hinged cover has been initially opened in the manner described above. Moreover, it possesses several unique features. For example, the part of the supplemental panel which is affixed to the cover serves as a reinforcement strip for the cover; similarly, the part of the supplemental panel affixed to the upstanding wall of the lower receptacle serves as a reinforcement strip for the lower receptacle. Furthermore, when the cover is closed, the two reinforcement strips are restored to their original edge-to-edge relationship, and they cooperate to provide a locking action for the cover which resists raising the cover to open position.

The carton of the present invention, as explained above, can be filled either from the top or from one end before the final closure of the carton. Thus, a carton of the same style can be turned out using commercially available top-filling or end-filling equipment. However, irrespective of how the carton is filled, the carton, after the supplemental panel has been separated, provides a reinforced container having a cover possessing a self-locking feature which can be opened and closed throughout a long period of use.

For a complete understanding of the present invention, reference can be made to the detailed description which follows, and to the accompanying drawings, in which.

Figure 1:
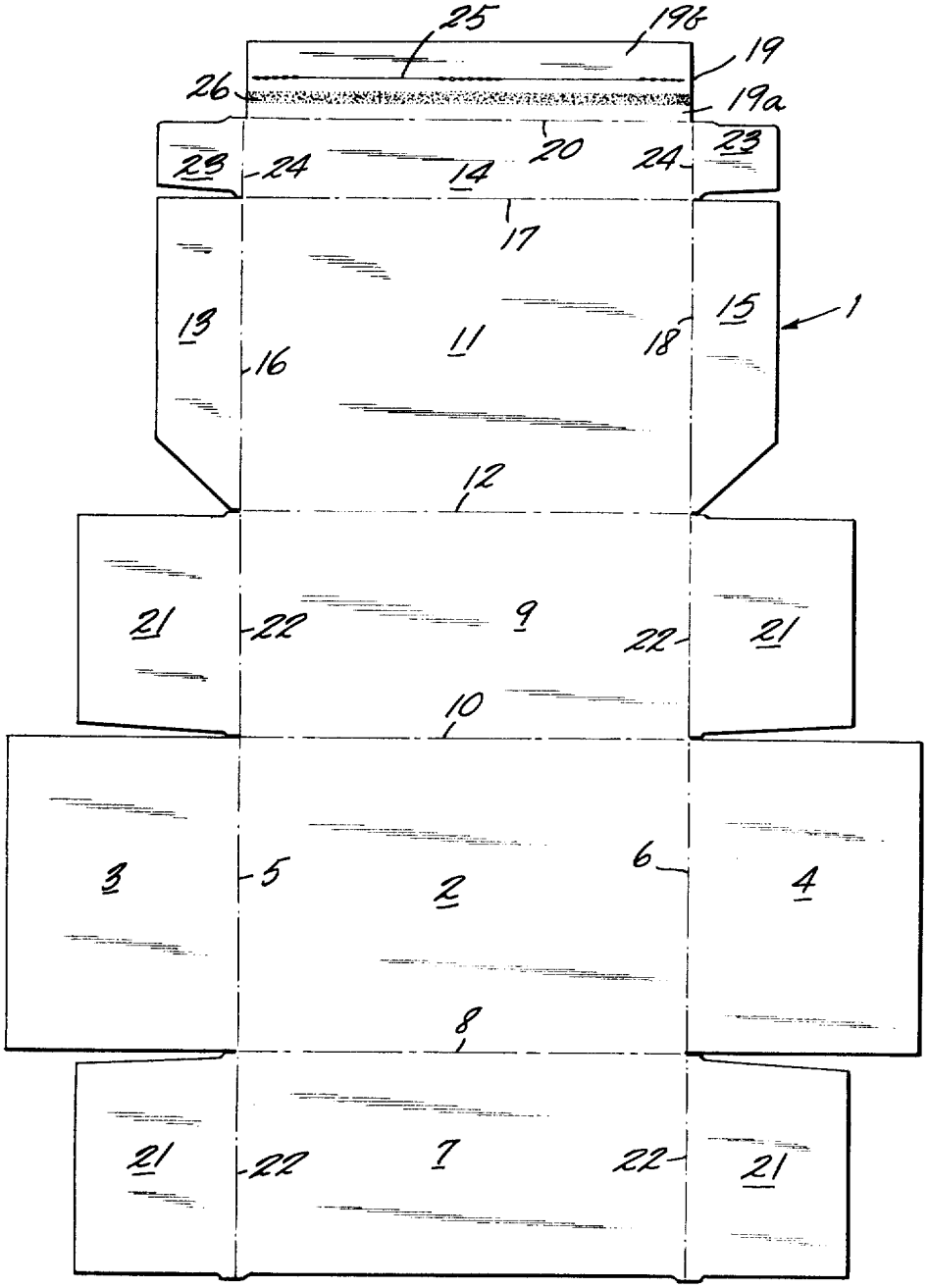
FIGURE 1 is a plan view of the cut and scored blank from which the carton of the present invention can be made.

The carton of the present invention is made from a novel cut and scored blank shown in FIGURE 1 and generally designated by the reference numeral 1. The blank can be made of paperboard, plastic or other sheet material and includes a panel 2, panels 3 and 4 connected to the panel 2 by scored lines 5 and 6, respectively, a panel 7 connected to the panel 2 by a scored line 8, a panel 9 connected to the panel 2 by a scored line 10, a panel 11 connected by a scored line 12 to the panel 9, panels 13, 14 and 15 connected to the panel 11 by the scored lines 16, 17 and 18, respectively, and a supplemental panel 19 connected to the panel 14 by a scored line 20. Panel connecting flaps 21 are joined to the panels 7 and 9 by scored lines 22. Also, panel connecting flaps 23 are joined to the panel 14 by scored lines 24.

The supplemental panel 19 has a weakened line 25 which extends substantially the entire length thereof so as to divide the panel into a part 19a which is connected to the panel 14 and an outer part 19b. In the embodiment of the invention illustrated in the drawings, the weakened line 25 is a perforated line or a line slit throughout a substantial portion of its length.

Figure 2:
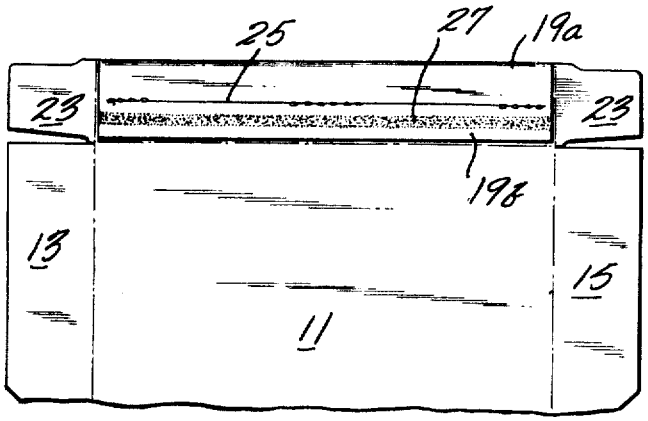
FIGURE 2 is a fragmentary view of part of the blank shown in FIGURE 1 following a folding operation.
Figure 4:
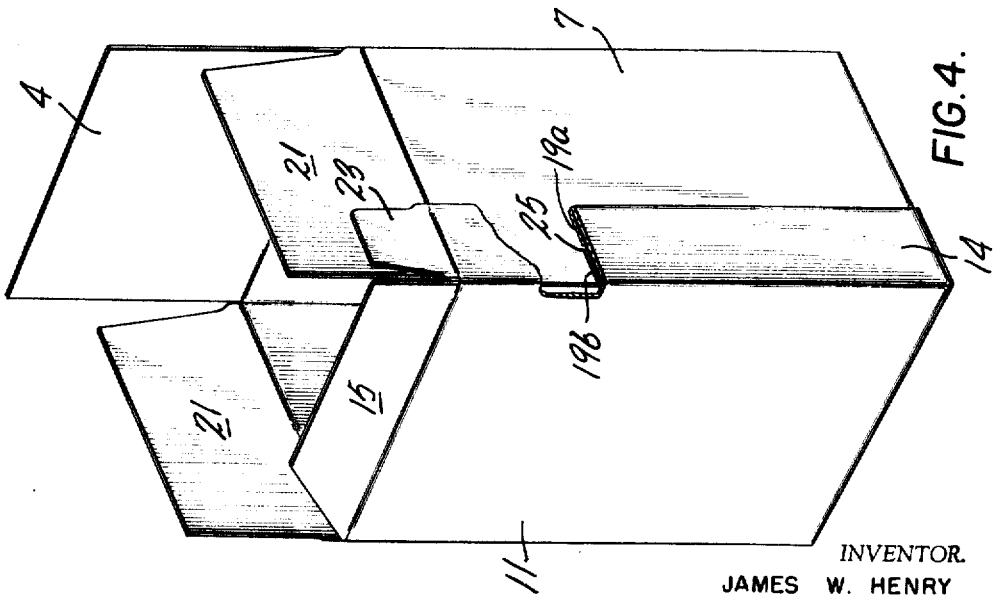
FIGURE 4 is an isometric view of the carton set up for end filling.

In setting up the carton in the condition shown in FIGURE 4 for end filling, the supplemental panel 19 is folded along the scored line 20 to overlie the panel 14, as shown in FIGURE 2, and the part of 19a of the supplemental panel is glued, stapled or otherwise affixed in face-to-face relationship with the panel 14. Toward this end, a strip of glue or adhesive, designated by the reference numeral 26 in FIGURE 1, can be initially applied to the side of the part 19a of the supplemental panel to be brought into face-to-face relationship with the panel 14, and a strip of glue or adhesive, designated by the reference numeral 27 in FIGURE 2, can be applied to the opposite side of the part 19b of the supplemental panel.

Figure 3:
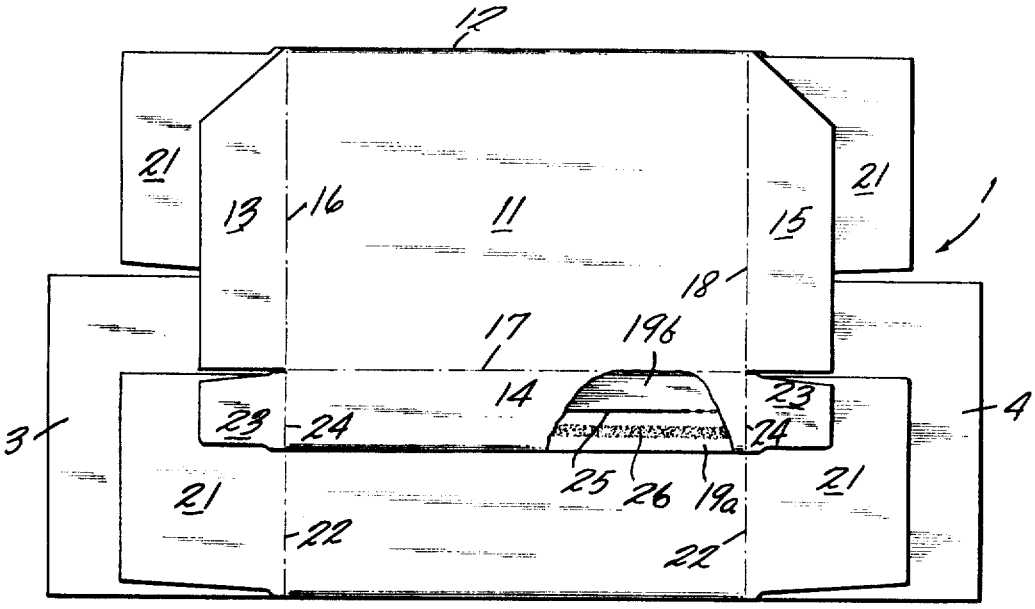
FIGURE 3 shows the blank at still a later stage in the formation of a carton.

The panels 7, 2, 9, and 11 are then joined to define a tube with the supplemental panel 19 interposed between and connecting the inner side of the panel 14 and the outer side of the panel 7. This can be conveniently accomplished by folding the panel 7 upwardly along the scored line 8 and the panel 11 downwardly along the scored line 12 so that the supplemental panel will lie between the panel 7 and the panel 14, as shown in FIGURE 3. While in this condition, the part 19b of the supplemental panel 19 is affixed by the glue or adhesive strip 27, or by other means, to the panel 7. If the panels 7, 2, 9 and 11 are now adjusted at right angles to one another and one end of the carton closed, the carton will be in the condition shown in FIGURE 4 ready for filling through the open end.

In closing the end of the carton, the panel 4 is bent inwardly along the scored line 6 and the flaps 21 are bent inwardly along their scored lines 22 and glued or otherwise affixed to the panel 4. The flap 23 is then bent inwardly along its scored line 24, and the panel 15 is bent inwardly along its scored line 18 and glued or otherwise affixed to the flap 23. It is, of course, a matter of choice whether the flaps 21 are glued to the inside or to the outside of the panel 4, and whether the connecting flap 23 is glued to the inside or the outside of the panel 15.

The carton can now be filled from its open end, and when the filling is completed, the open end can be closed in the manner described above.

Figure 6:
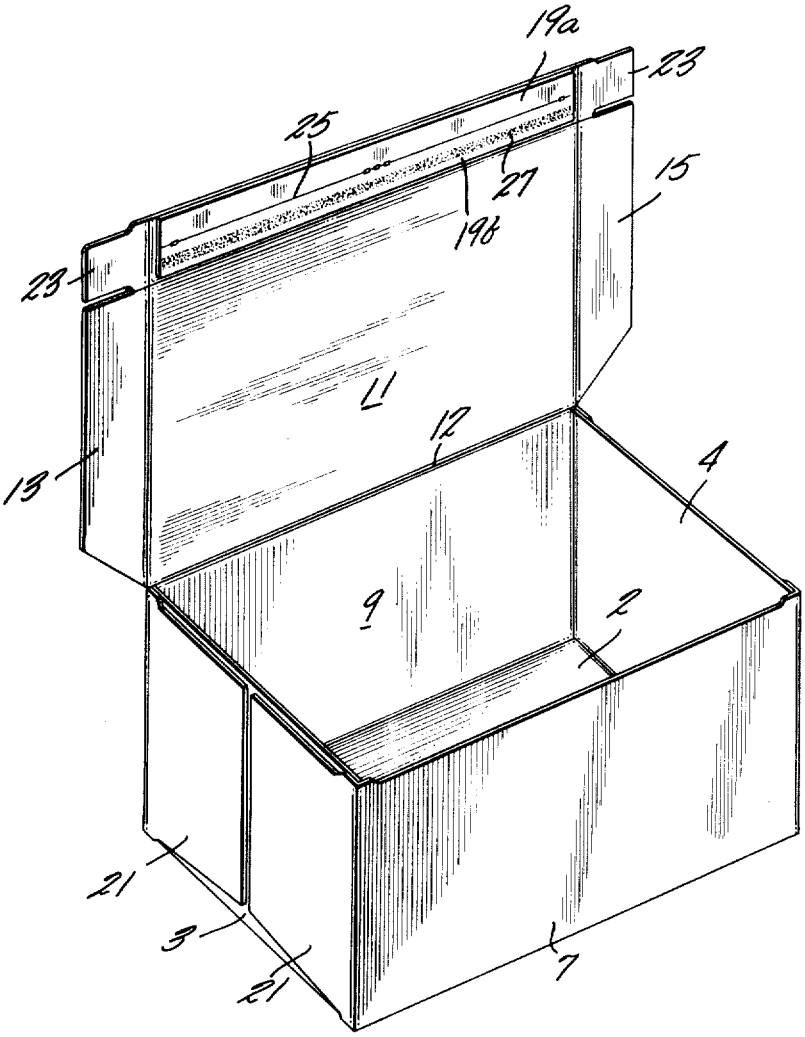
FIGURE 6 is an isometric view of the carton set up for top filling.

In setting up the carton in the condition shown in FIGURE 6 for top filling, the lower receptacle of the carton is first formed by pivoting the panels 3, 4, 7 and 9 to upstanding positions and affixing the flaps 21 to the panels 3 and 4. The carton can now be filled from the top and when the filling is completed, the cover panel 11 is pivoted downwardly to overlie the contents. The cover is closed by bending the panel 14 downwardly parallel to the upstanding panel 7, so that the supplemental panel 19 is interposed between the exterior side of the panel 7 and the interior side of the panel 14, and the portion 19b of the supplemental panel is affixed to the panel 7. The connecting flaps 23 are bent rearwardly along the score lines 24, the panels 13 and 15 are bent downwardly along the scored lines 16 and 18, respectively, to overlie the connecting flaps 23, and the connecting flaps 23 are affixed to the panels 13 and 15 to complete the closure of the carton.

Figure 5:
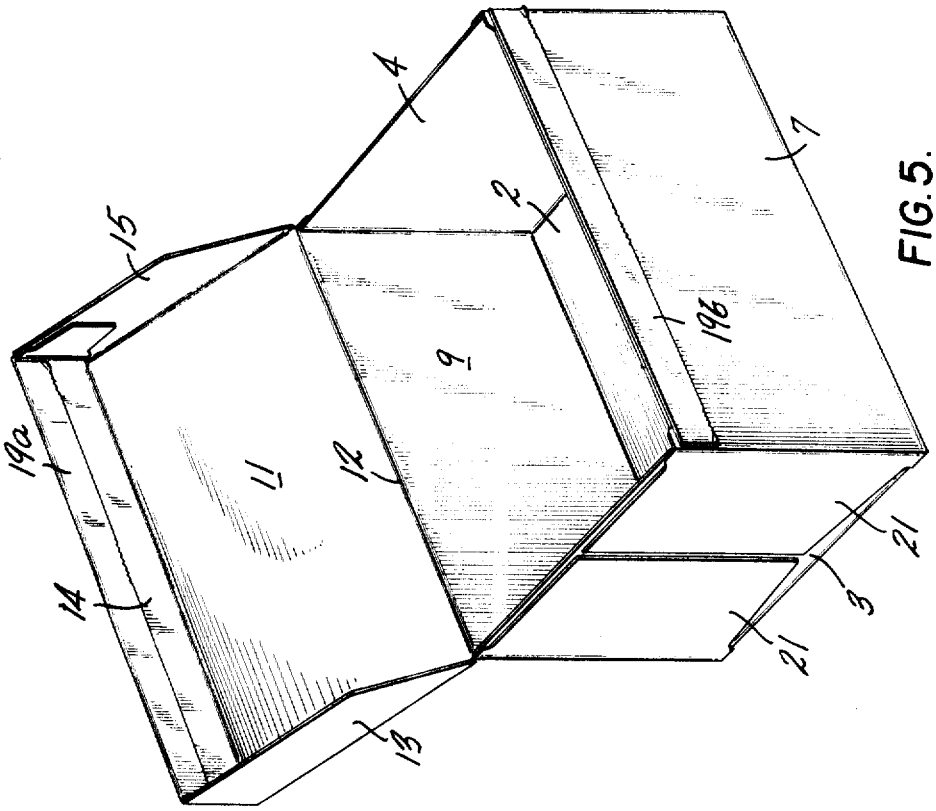
FIGURE 5 is an isometric view of the carton of the present invention with the supplemental panel separated and the cover raised.

As best shown in FIGURE 5, the carton of the present invention, in its preferred embodiment, comprises the bottom panel 2, upstanding front and rear wall panels 7 and 9, respectively, and upstanding end wall panels 3 and 4 connected to the upstanding panels 7 and 9 by the flaps 21. The top or cover panel 11 is hinged to the rear wall panel 9 by the scored line 12. This cover panel carries downwardly depending side and front wall panels 13, 14 and 15 which fit in telescoping relationship with the upper ends of the upstanding walls 3, 4 and 7 of the carton. The downwardly depending side wall panels 13, 14 and 15 are connected by the flaps 23.

Before the carton is opened by breaking the supplemental panel 19 along the weakened line 25, the supplemental panel serves to keep the cover of the carton closed. In this connection, as explained above, the part 19a of the supplemental panel is folded back along the scored line 20 and affixed to the inside of the downwardly depending front wall 14 of the cover, and the other part 19b is affixed to the outside or front face of the front wall 7 near the upper edge thereof.

The carton can be easily opened by lifting the front of the cover, thereby separating the panel 19 along the weakened line 25. When the panel 19 is thus separated, the part 19b remains fixed to the outside of the front wall 7 and forms a reinforcing strip along the upper edge of the front wall of the carton. The part 19a, on the other hand, is affixed to the front wall 14 of the cover and is thereby carried upwardly therewith, forming a reinforcing strip along the lower edge of the front wall of the cover.

When the cover is thus opened, the contents can be removed and the cover reclosed. When the cover is reclosed, the strip 19a of the cover will be restored to its original edge-to-edge relationship with respect to the strip 19b, thereby providing a locking feature which will tend to hold the lid in closed condition.

From the above explanation, it is apparent that the strips 19a and 19b reinforce both the lower portion of the carton and the cover therefor, thereby imparting added strength to the carton. This added reinforcement makes it possible, if desired, to make the carton of lighter weight or less costly materials. The hinged top makes for ease of removal of the contents of the carton and also makes it possible for the carton to be reclosed so that the contents can be removed from time to time, and the carton used to store the contents. In addition, the tendency of the strips 19a and 19b to return to edge-to-edge relationship tends to lock the cover in closed position, although it can be readily opened by applying a lifting force to the cover.

The invention has been described in a single, preferred form, and by way of example only, and obviously, many variations or modifications may be made therein without departing from the spirit of the invention. For example, it is obvious that the blank can be designed with the supplemental panel 19 between two other panels, instead of being an end panel of the blank as shown in FIGURE 1. The invention, therefore, is not to be limited to any specified form or embodiment, except insofar as such limitations are expressly set forth in the claims.

I claim:

1. A carton made from a cut and scored blank which can be partially set up for end filling and then closed or partially set up for top filling and then closed comprising a front wall panel, a bottom wall panel joined to the front wall panel by a scored line, a rear wall panel joined to the bottom wall panel by a scored line, means forming side wall panels at both sides of the carton joined to at least one of the aforementioned panels by scored lines, a flap joined by a scored line to a panel adjacent a panel to which a side wall panel is connected, said side wall panel being affixed to said flap, a cover panel joined to the rear wall panel by a scored line, a pair of panels in side-by-side relation joining the cover panel and the front wall panel, one connected by a scored line to the front edge of the cover panel and the other sandwiched between said last-mentioned panel and said front wall panel, said sandwiched panel being divided into upper and lower portions by an unbroken, weakened line, the upper portion being affixed in contact with the front face of the front wall panel, and the lower portion being affixed in contact with the rear face of the panel which is connected to the cover panel, depending side panels connected by scored lines to each side of the cover panel, and flaps joining said depending side panels at right angles to said depending front panel, the carton being opened by breaking the weakened line to provide a recloseable cover having three connected downwardly depending panels which telescope over the side and front wall panels, with the opposite edges of the broken line forming interlocking edges when the cover is closed.

*2. A carton, made from a cut and scored blank which can be partially set up for end filling and then closed or partially set up for top filling and then closed, comprising a receptacle body portion including front and rear wall panels, means forming side wall panels and means forming bottom wall panels, a cover panel joined to the rear wall panel by a scored line, a pair of panels in side-by-side relation joining the cover panel and the front wall panel, one connected by a scored line to the front edge of the cover panel and depending therefrom and the other sandwiched between said depending panel and said front wall panel, said sandwiched panel being divided into upper and lower portions by an unbroken weakened line and being connected by a scored line to an adjoining panel of the blank, the one of said upper and lower portions that is more remote from said adjoining panel being affixed to a non-adjoining panel of the blank, depending side panels connected by scored lines to each side of the cover panel, and flaps joining said depending side panels at right angles to said depending front panel, the carton being opened by breaking the weakened line to provide a recloseable cover having three connected downwardly depending panels which telescope over the front wall panel and the side wall panel means, with the opposite edges of the broken line forming interlocking edges when the cover is closed.*

*3. A tamperproof reclosable carton formed of a suitably cut and scored blank having a receptacle portion and a cover portion which telescopes over the upper edges of said receptacle portion; said receptacle portion having first and second receptacle panels; said cover portion having a top panel and first and second cover panels forming skirt portions parallel and adjacent to the respective underlying first and second receptacle panels; a first locking panel portion hingedly connected to one of said first panels, a second locking panel portion detachably connected to said first locking panel portion and being adhered to the other first panel, said first and second locking panel portions lying between and parallel to the inner surface of said first cover panel and the outer surface of said first receptacle panel.*

*4. A tamperproof reclosable carton formed of a suitably cut and scored blank having a receptacle portion and a cover portion which telescopes over the upper edges of said receptacle portion; said receptacle portion comprising hingedly connected front, rear, side and bottom receptacle panels, said cover portion comprising a top panel hingedly connected to the upper edge of said rear panel, end cover panels and a front cover panel all hingedly connected to said top panel and forming skirt portions parallel and adjacent to the respective underlying receptacle panels, a first locking panel hingedly connected to one of said front panels, a second locking panel detachably connected to said first locking panel and being adhered to the other front panel, said first and second locking panels lying between and parallel to the inner surface of said front cover panel and the outer surface of said front receptacle panel.*

*5. A tamperproof reclosable carton formed of a single suitably cut and scored blank having a receptacle portion and a cover portion which telescopes over the upper edges of said receptacle portion; said receptacle portion comprising hingedly connected front, rear, side and bottom receptacle panels; said cover portion comprising a top panel hingedly connected to the upper edge of said rear panel, end cover panels and a front cover panel all hingedly connected to said top panel and forming skirt portions parallel and adjacent to the respective underlying receptacle panels; a first locking panel hingedly connected to one of said front panels; a second locking panel detachably connected along one edge to said first locking panel and being adhered to the other front panel, said first and second locking panels lying in a common plane between and parallel to the inner surface of said front cover panel and the outer surface of said front receptacle panel.*

*6. A tamperproof reclosable carton formed of a single suitably cut and second blank having a receptacle portion and a cover portion which telescopes over the upper edges of said receptacle portion; said receptacle portion comprising hingedly connected front, rear, side and bottom receptacle panels; said cover portion comprising a top panel hingedly connected to the upper edge of said rear panel, end cover panels and a front cover panel all hingedly connected to said top panel and forming skirt portions parallel and adjacent to the respective underlying receptacle panels; a retaining element adhered to the outer surface of said front receptacle panel; a lip element hingedly connected to the front cover panel and being detachably connected along one edge to said retaining element; said lip and retaining element lying in a common plane between and parallel to the inner surface of said front cover panel and the outer surface of said front receptacle panel.*

References Cited by the Examiner

The following references, cited by the Examiner, are of record in the patented file of this patent or the original patent.

UNITED STATES PATENTS

| | | | |
|---|---|---|---|
| 1,130,271 | 3/1915 | Hammond | 229—45 |
| 1,770,226 | 7/1930 | Bliss | 229—51 X |
| 1,992,222 | 2/1935 | La Grua | 229—51 |
| 2,181,837 | 11/1939 | Snyder et al. | 229—51 |
| 2,246,484 | 6/1941 | Frieders | 229—51 |
| 2,361,597 | 10/1944 | Buttery | 229—51 |
| 2,396,310 | 3/1946 | Yungblut | 229—51 |
| 2,557,914 | 6/1951 | Miller | 229—51 |
| 2,777,629 | 1/1957 | Osteen | 229— 45 X |

FOREIGN PATENTS

| | | |
|---|---|---|
| 537,301 | 2/1957 | Canada. |

JOSEPH R. LECLAIR, *Primary Examiner.*

FRANKLIN T. GARRETT, *Examiners.*

DAVIS T. MOORHEAD, *Assistant Examiner.*